ial No. 439,402

UNITED STATES PATENT OFFICE 2,396,923

POISON GAS PROTECTION

Majer Mendelsohn, New York, N. Y.

No Drawing. Application April 17, 1942,
Serial No. 439,402

37 Claims. (Cl. 252—186)

This invention relates to a process for preparing substances for counteracting or protecting against the effect of poison gases, the product of such process, the process of treating materials with the product of such process, and the product of treating such materials.

This application is a continuation in part of application, Serial No. 399,562, filed June 24, 1941.

Particular reference, in regard to process and products, will be made in relation to their application for use in defense against attack by substances such as the material generally known under the name, mustard gas. Although termed a gas in its name, the properties of the substance are such that, at ordinary temperatures, it is not a gas. In fact, such substance may be handled under pressure as a liquid at temperatures slightly in excess of average, or it may be held in solution, as, for instance, in solvents such as the chlorinated hydrocarbons. Then, when it is used for attack, it is sprayed into the air, where it forms a suspension in the form of a cloud of fine drops.

These fine drops forming the suspension then act directly upon any substance with which they come into contact. Attack against the person through the nose or mouth may, by suitable means, be made ineffective; the danger lies in the destructive effect of the substance, as, for instance, when drops of the mustard gas, either as the dispersed liquefied substance or its solution, come into contact with the skin of the body, with clothing covering the body, or with other coverings, as, for instance, for foodstuffs or the like. The substance directly acts upon the skin of the body, penetrating easily and quickly through ordinary clothing. Also, it impregnates food held in packages, or the surfaces over which one may have to walk. When one walks over such a surface after the drops have fallen thereon, the destructive substance will penetrate through leather or rubber soles, and attack the skin of the wearer.

It is an object of the invention to provide means for barring access of the destructive substance to that which is to be protected, as, for instance, through the clothing or from a floor to the skin of the person, by destroying the substance before it can attain such access, or so chemically to change the substance that it cannot produce any of the reactions of mustard gas with that which is to be protected.

It has been found that substantially all known impermeable or relatively impermeable materials, when used as a means of protection against the destructive effects of mustard gas, provide no effective barrier to passage of the mustard gas therethrough, either by absorption of the substance by the material or by actual destruction of the material, the result desired by the enemy.

It is an object of the invention to produce a protective substance which may be used in the manufacture of protective garments, coverings, or the like, to impart substantial impermeability against the destructive substance, as, for instance, by continuing to destroy the destructive substance during attack, as such substance may come into direct contact with the protective substance of garment or covering so that such destructive substance may not pass unchanged into contact with anything to be protected thereagainst.

Other objects of this invention will be set forth hereinafter, or will be apparent from the description wherein certain embodiments for carrying out the invention are exemplified.

The invention, however, is not intended to be restricted to any particular composition, or any particular proportion, or any particular product, or any particular application of any such composition or proportion or product, or any particular process of preparation, or method of operation or use, or any of various details thereof, even where specifically described herein, as the same may be modified in various particulars or may be applied in many varied relations without departing from the spirit and scope of the claimed invention, of which the exemplifying embodiments, herein described, are intended only to be illustrative, and only for the purpose of complying with the requirements of the statutes for disclosure of an operative embodiment, but not to demonstrate all of the various modifications in which the invention might be embodied.

The basic destructive ingredient of mustard gas is capable of destruction by oxidation. A proper means to effectuate such oxidation must be capable of accomplishing the oxidation rapidly enough so that the destructive ingredient, before it comes into contact with that which is to be protected thereagainst, as, for instance, the body of the wearer of a garment, will have passed through a complete chemical change to a non-dangerous substance. Such an oxidizing agent, for purposes of this invention, must be capable of being embodied into materials of high flexibility for use, for instance, in garments. Among such ingredients have been found that class of compounds having chromic anhydride coupled with an alkali oxide group, as, for instance, the chromates or dichromates of the alkali metals.

Such substances normally are solids, and thus present the problem of maintaining them in condition immediately to react upon the destructive ingredient. The presence of moisture at the point of reaction of the destructive ingredient with the protective substance enters as a requirement. That is, water must be made available in such state that the effect of a reactive solution is present immediately as the attack by the destructive ingredient takes place, so that the oxygen of the chromic anhydride may be available instantly to oxidize the destructive ingredient. For this purpose, moisture may be provided by incorporating a hygroscopic element, or by locking moisture or water in such relation to the oxidizing ingredient, in the components of the protective substance, whether embodied as coating or sheet, to produce the effect of a solution for the oxidizing substance, that is, the chromate, dichromate, or the like.

Furthermore, a substantially greater rapidity of oxidation has been found to follow when the protective substance is acid, possibly because of the presence of dichromate. To effect this result, a weak acid may be used as one of the ingredients in making the coating. It is to be noted that substantially the same composition may be utilized, whether the protection against the mustard gas be provided in the form of a coating upon other materials, or as a sheet, with or without other materials. Therefore, the terms, "coating" and "sheet" are used interchangeably herein.

It may be desired to make a garment, embodying features of the invention, to be resistant to moisture. The protective substance, produced as hereinafter set forth, normally is water resistant, repelling moisture. In fact, even the drops of a suspension of mustard gas will roll off a garment embodying elements of the invention. However, if a further factor of moisture resistance is desired to be set up, the protective substance may include an ingredient the whole purpose of which is to repel or shed water. Ingredients of this kind, useful for the purposes stated, include compounds such as the esters of the fatty acids, the glyceryl fatty acids, the glycol fatty acids, and the like. High efficiency for this purpose has been attained by the use of glycerol monolaurate, glycerol dilaurate, or glyceryl monoricinoleate as an ingredient in the preparation of the protective substance.

Maintenance of a substantially constant temperature has been found to be of importance properly to effect the steps of preparing the batch from which the protective substance is obtained. Also, the batch during mixing, and the batch after it has been mixed and up to the time of spreading, should be maintained at a substantially constant temperature. Control of the process is best effected when the temperature of the batch is between 55° C. and 70° C. Once the batch has been brought up to a preliminarily indicated temperature, it is to be understood, in this connection, that substantially little, if any, variation in that temperature should be permitted, especially after the chromate or dichromate has been added, as hereinafter set forth.

First, in preparing the batch, gelatin is taken up in water, so that about 20 parts of the solid gelatin is dissolved or mixed with added water to make up 100 parts of solution. A temperature found highly effective for the batch, during processing, is 60° C.

In this connection, it is to be noted that the word, gelatin, is intended to have significance not only for the usual trade material known by that name, but also other materials having substantially similar characteristics, including albuminoids such as glue or the like, wherein such materials are made insoluble in water by the action of ingredients such as the alkali chromates. The solution of gelatin in water to make a 20% solution is the customary proportion by which, say 20 grams, of the solid are dissolved or mixed in water, and then water is added until the total volume, for the weight indicated, is 100 cubic centimeters. Furthermore, in some cases where such materials are taken up with water, a colloidal suspension, rather than a true solution, may be produced.

After this solution of gelatin has been prepared, the plasticizer may be added. Glycerin lends itself very effectively for this purpose, because of its high hygroscopicity. Also, in the final product, the glycerin will tend to maintain the coating or sheet produced from the reaction product in a flexible state. Other materials may be used for substantially similar purpose, as, for instance, diethylene glycol, various sugar derivatives, derivatives of hexahydric alcohols, such as sorbitol, and the like.

In order to provide an example, glycerin is considered herein. In that relation, the quantity of glycerin added to the batch is determined in accordance with a number of factors, including the flexibility desired, that is, the flexibility of the material as used in the garment as it is finally developed. A range of from 10 to 60 grams of glycerin in relation to 100 grams of the dry gelatin has been found effective.

After the glycerin has been mixed into the batch, the batch is weakly acidified. This may be effected by adding a weak acid such as citric acid. About 2% of such acid, based upon the weight of the gelatin, may be added. When the protective substance is thus in an acid state, the destruction of the mustard gas will proceed at a more rapid pace, and resistance thereto, therefore, is greater.

The batch is now ready for the hardening stage. In this connection, while it is possible to produce the result by other oxidizing and hardening agents, the property of the derivatives of chromic anhydride is specifically indicated for this purpose, and particularly where the chromic anhydride is in the form of chromate or dichromate. The salts of sodium and potassium have been found most desirable for the purposes of this reaction. The chromate or dichromate may be in the amount of about 25% of the dry weight of gelatin.

The batch remains substantially fluid for a considerable period after the chromate or dichromate has been added and so long as the batch temperature remains substantially constant. The reaction product is agitated, and then is applied to the sheet material to be coated. Substantially any material, itself having sufficient elasticity and having a surface to which the reaction product will adhere, may be used for this purpose. Materials such as paper, textiles, rubber, and the like lend themselves for this purpose. The reaction product also may be spread upon metallic tables which do not react chemically with the ingredients of the protective substance, to form thin sheets. In either case, the process of spreading may involve the use of a doctor blade, or any other suitable method. For instance, a felt-covered roll may be rotated in a trough containing the reaction product. Paper, textile or rubber, in sheet, strip or other suitable form, may be passed into contact with the rotating roll. Materials to be coated may be dipped. When the reaction product is spread to form thin sheets, those sheets, after proper thickening has occurred, may then be handled to provide plys.

The amount of the chromate or dichromate used is far in excess of the amount required to make gelatin insoluble in water. Thus, fabric, paper, rubber or the like, coated with the substance prepared in this manner, will shed water and the globules of the suspension in air of the mustard gas. However, if it is desired to assure waterproof properties to a greater degree, ingredients may have been added to the batch during the mixing. For instance, the addition of quantities of one or more of the esters of fatty acids, or of the esters of the glycerol fatty acids, or of the esters of the glycol fatty acids will impart the waterproofing property to the batch as finally made ready for coating or for forming a sheet, and thus, to the material which has been coated therewith, or formed therefrom. These fatty substances, in a quantity of between 20% to 30% of the weight of the dry gelatin, when added to the batch, will effectuate the desired result in the final product. Particular instances of esters effective for the purposes indicated are glycerol monolaurate, glycerol dilaurate, and glyceryl monoricinoleate.

Other factors of waterproofing also require consideration. For instance, a plasticizer such as glycerin, which is hygroscopic, may be replaced by one which itself is insoluble in water. Such plasticizers include phthalic acid and its salts, phosphate salts, salicylic acid, and the like. A small amount of glycerin may still be required in these cases to assure good flexibility. In such cases, a high degree of waterproofing is attained; it is more complete than if glycerin alone were used. In the case of textiles, croton oil or rape seed oil may be used as plasticizers. These last ingredients provide complete substitutes for glycerin.

Water, of course, is present in some form necessary to facilitate the oxidation reaction, but the exact form is not clear. The imprisoned water, whether imprisoned during the hardening process or otherwise, is, in the case of any of these plasticizers, immediately available to make the oxidizing reagent immediately effective upon the destructive substance. For instance, very effective plasticizers having these properties have been found in those amino compounds where from twelve to sixteen carbon atoms are present in the amino group, and where the compound is soluble in water, is acidic, and is liquid.

Likewise, glycerin itself may be made substantially insoluble in water. For this purpose, by the addition of blood or egg albumen to the glycerin, the glycerin itself is made insoluble. For instance, if between 20% to 25% of egg or blood albumen, based on the weight of glycerin, be added to the glycerin, the glycerin becomes substantially insoluble.

As herein indicated, the protective substance may be applied for the purposes of the invention as a coating upon materials such as those normally used in manufacturing garments; likewise, it may be prepared in the form of a sheet which then may be built up into a protective fabric or sheet material by forming a sheath of a plurality of plys of such sheet, or by using such sheet to form a layer with one or more plys of other or dissimilar materials, as, for instance, paper, textile, rubber or the like. The substance, either as layer, coating, or however it may be used, interposes itself as a barrier to passage of the destructive substance, as such, to react upon the particular thing to be protected. The protective substance has the characteristic of flexibility, and yet imports no substantial increase in weight to a protective garment of which it may form a part, so that such protective garment may be carried with ease.

For certain purposes of the invention, it may be found desirable first to coat or impregnate a carrier material, such as textile or the like, with a solution of gelatin. Then the several ingredients may be worked into the coated material, with the final addition of the chromate or dichromate. Sheets of the material, formed by applying the protective substance to metallic plates, may be picked up and positioned between layers of different materials such as rubber or the like. When a protective covering is prepared from such materials, so prepared, the seams may be closed by adhering the lapped portions of sheets by means of the plastic mass of the batch before it has congealed fully.

On attack by mustard gas, the fluid particles strike the protective covering, and are intercepted by the protective coating or ply. The chromate or dichromate, in large excess, is maintained in reactive state by the moisture obtained either from the imprisoned moisture, or by the hygroscopicity of an ingredient, as, for instance, of a plasticizer such as glycerin. It may be active at a high oxidizing degree because of the acid state resulting from the presence of the citric or similar weak acid. The gas is oxidized by the chromate to the destruction of its dangerous character, and remains as relatively harmless reaction products.

Many other changes could be effected in the particular composition, and in the proportions thereof, and in the particular products, and in the method of preparation and use, and in specific details thereof, hereinbefore set forth, without substantially departing from the invention defined in the claims, the specific description being merely embodiments capable of illustrating certain principles of the invention.

I claim:

1. The process of preparing materials for use in obtaining protection against attack by substances such as mustard gas, including the step of intermixing gelatin and a quantity of a hardening agent of substantially high oxidizing power and in excess over the quantity required for hardening the gelatin, and forming a thin, flexible, protective layer from the reacted material.

2. The process of preparing materials for use in obtaining protection against attack by substances such as mustard gas, including the step of intermixing an aqueous solution of gelatin and a quantity of a hardening agent of substantially high oxidizing power and in excess over the quantity of the agent required for hardening the gelatin, and forming a thin, flexible, protective layer from the reacted material.

3. The process of preparing materials for use in obtaining protection against attack by substances such as mustard gas, including the step of intermixing a weakly acidulated aqueous solution of gelatin and a quantity of a hardening agent of substantially high oxidizing power and in excess over the quantity required for hardening the gelatin, and forming a thin, flexible, protective layer from the reacted material.

4. The process of preparing materials for use in obtaining protection against attack by substances such as mustard gas, including the step of intermixing, in the presence of a plasticizer, gelatin and a quantity of a hardening agent of substantially high oxidizing power and in excess over the quantity of the agent required for hardening the gelatin, and forming a thin, flexible, protective layer from the reacted material.

5. The process of preparing materials for use in obtaining protection against attack by substances such as mustard gas, including the step of intermixing, at a temperature of about 55°–70° C., gelatin and a quantity of a hardening agent of substantially high oxidizing power and in excess over the quantity required for hardening the gelatin.

6. The process of preparing materials for use in obtaining protection against attack by substances such as mustard gas, including the step of intermixing, at a substantially constant temperature of about 60° C., gelatin and a quantity of a hardening agent of substantially high oxidizing power and in excess over the quantity required for hardening the gelatin.

7. The process of preparing materials for use in obtaining protection against attack by substances such as mustard gas, including the step of intermixing, in the presence of a plasticizer and at a substantially constant temperature of about 60° C., a weakly acidulated aqueous solution of gelatin and a quantity of a hardening agent of substantially high oxidizing power and in excess over the quantity of the agent required for hardening the gelatin.

8. The process of preparing materials for use in obtaining protection against attack by substances such as mustard gas, including the step of intermixing gelatin and a quantity, in excess over the quantity required for hardening the gelatin, of a salt of substantially high oxidizing power of an alkali metal and an acid containing chromium, and forming a thin, flexible, protective layer from the reacted material.

9. The process of preparing materials for use in obtaining protection against attack by substances such as mustard gas, including the step of intermixing gelatin and a quantity, in excess over the quantity required for hardening the gelatin, of a salt of an alkali metal and an acid having its derivation in chromic anhydride, and forming a thin, flexible, protective layer from the reacted material.

10. The process of preparing materials for use in obtaining protection against attack by substances such as mustard gas, including the step of intermixing gelatin and a quantity, in excess over the quantity required for hardening the gelatin, of a salt of an alkali metal and dichromic acid, and forming a thin, flexible, protective layer from the reacted material.

11. The process of preparing materials for use in obtaining protection against attack by substances such as mustard gas, including the step of intermixing an aqueous solution of gelatin acidulated with citric acid and a quantity of a hardening agent of substantially high oxidizing power and in excess over the quantity required for hardening the gelatin, and forming a thin, flexible, protective layer from the reacted material.

12. The process of preparing materials for use in obtaining protection against attack by substances such as mustard gas, including the step of intermixing, in the presence of a moisture-introducing plasticizer, gelatin and a quantity of a hardening agent of substantially high oxidizing power and in excess over the quantity required for hardening the gelatin, and forming a thin, flexible, protective layer from the reacted material.

13. The process of preparing materials for use in obtaining protection against attack by substances such as mustard gas, including the step of intermixing, in the presence of a plasticizer and an ester of the higher fatty acids, gelatin and a quantity of a hardening agent of substantially high oxidizing power and in excess over the quantity required for hardening the gelatin, and forming a thin, flexible protective layer from the reacted material.

14. The process of preparing materials for use in obtaining protection against attack by substances such as mustard gas, including the step of intermixing, in the presence of a substance selected from the group consisting of the higher fatty acid esters, gelatin and a quantity, in excess over the quantity required for hardening the gelatin, of a hardening agent of substantially high oxidizing power, and forming a thin, flexible, protective layer from the reacted material.

15. The process of preparing materials for use in obtaining protection against attack by substances such as mustard gas, including the step of intermixing, in the presence of a plasticizer, gelatin acidulated with citric acid and a quantity, in excess over the quantity required for hardening the gelatin, of a salt of an alkali metal and dichromic acid, and forming a thin, flexible, protective layer from the reacted material.

16. The process of preparing materials for use in obtaining protection against attack by substances such as mustard gas, including the step of intermixing, at a temperature of about 55°–70° C. and in the presence of a moisture-introducing plasticizer, gelatin acidulated with citric acid and a quantity, in excess over the quantity required for hardening the gelatin, of a salt of an alkali metal and dichromic acid, and spreading the reaction product in a thin layer over a surface.

17. The process of preparing materials for use in obtaining protection against attack by substances such as mustard gas, including the step of intermixing a 20% aqueous solution of gelatin and an excess over the quantity required for hardening the gelatin of a hardening agent of substantially high oxidizing power, and forming a thin, flexible, protective layer from the reacted material.

18. The process of preparing materials for use in obtaining protection against attack by substances such as mustard gas, including the step of intermixing a 20% aqueous solution of gelatin and a hardening agent of substantially high oxidizing power in the ratio of about one part of hardening agent to four parts of gelatin, and forming a thin, flexible, protective layer from the reacted material.

19. The process of preparing materials for use in obtaining protection against attack by substances such as mustard gas, including the step of intermixing a 20% aqueous solution of gelatin and a quantity of about one part of an alkali salt of an acid having its derivation in chromic anhydride to four parts of gelatin, and forming a thin, flexible, protective layer from the reacted material.

20. The process of preparing materials for use in obtaining protection against attack by substances such as mustard gas, including the step of intermixing, at a temperature of about 55°–70° C. and in the presence of a plasticizer, a 20% aqueous solution of gelatin, and a quantity of a hardening agent of substantially high oxidizing power, where the plasticizer is present in the ratio of about 10 to 40 parts of plasticizer to 20 parts of gelatin and where about one part of hardening agent is intermixed with four parts of gelatin.

21. A thin, flexible coating for relatively thin, flexible materials such as paper or cloth, for use in obtaining protection against attack by substances such as mustard gas, the coating being the product of intermixing gelatin and an excess over the quantity required for hardening the gelatin of a hardening agent of substantially high oxidizing power.

22. A thin, flexible coating for relatively thin, flexible materials such as paper or cloth, for use in obtaining protection against attack by substances such as mustard gas, the coating being the product of intermixing an aqueous solution of gelatin and an excess over the quantity required for hardening the gelatin of a hardening agent of substantially high oxidizing power.

23. A thin, flexible coating for relatively thin, flexible materials such as paper or cloth, for use in obtaining protection against attack by substances such as mustard gas, the coating being the product of intermixing a weakly acidulated solution of gelatin and an excess over the quantity required for hardening the gelatin of a hardening agent of substantially high oxidizing power.

24. A thin, flexible coating for relatively thin, flexible materials such as paper or cloth, for use in obtaining protection against attack by substances such as mustard gas, the coating being the product of intermixing, in the presence of a plasticizer, a weakly acidulated solution of gelatin and in excess over the quantity required for hardening the gelatin of a hardening agent of substantially high oxidizing power.

25. A coating for use in obtaining protection against attack by substances such as mustard gas, the coating being the product of intermixing, in the presence of a plasticizer and at a temperature of about 55°–70° C., a weakly acidulated solution of gelatin and an excess over the quantity required for hardening the gelatin of a hardening agent of substantially high oxidizing power.

26. A thin, flexible coating for relatively thin, flexible materials, such as paper or cloth, for use in obtaining protection against attack by substances such as mustard gas, the coating being the product of intermixing, in the presence of a moisture-introducing plasticizer, a weakly acidulated solution of gelatin and an excess over the quantity required for hardening the gelatin of a salt of an alkali metal and an acid having its derivation in chromic anhydride.

27. A thin, flexible coating for relatively thin, flexible materials, such as paper or cloth, for use in obtaining protection against attack by substances such as mustard gas, the coating being the product of intermixing, in the presence of a moisture-introducing plasticizer such as glycerin, an aqueous solution of gelatin acidulated with citric acid and an excess over the quantity required for hardening the gelatin of a salt of an alkali metal and dichromic acid.

28. A thin, flexible coating for relatively thin, flexible materials such as paper or cloth, for use in obtaining protection against attack by substances such as mustard gas, the coating being the product of intermixing, in the presence of a moisture-introducing plasticizer and of a substance selected from the group consisting of the higher fatty acid esters, an aqueous solution of gelatin acidulated with citric acid and an excess over the quantity required for hardening the gelatin of a salt of an alkali metal and dichromic acid.

29. A coating for use in obtaining protection against attack by substances such as mustard gas, the coating being the product of intermixing, in the presence of a moisture-introducing plasticizer and of a substance selected from the group consisting of the higher fatty acid esters, a 20% aqueous solution of gelatin acidulated with citric acid and about one part of a salt of an alkali metal and dichromic acid to four parts of the gelatin.

30. A coating for use in obtaining protection against attack by substances such as mustard gas, the coating being the product of intermixing, in the presence of a moisture-introducing plasticizer and of a substance selected from the group consisting of the higher fatty acid esters, a 20% aqueous solution of gelatin acidulated with citric acid and a salt of an alkali metal and dichromic acid, where the plasticizer is present in the ratio of about 10 to 40 parts of plasticizer to 20 parts of gelatin and where about one part of hardening agent is intermixed with four parts of gelatin.

31. The process of preparing protective shields against substances such as mustard gas, including the steps of intermixing gelatin in aqueous solution and a quantity of an oxidizing agent which also is effective as a hardening agent for gelatine, the quantity of such oxidizing agent being sufficient so that a substantial quantity thereof will remain effective as an oxidizing agent and dispersed throughout the gelatin after the gelatin has become hardened, and forming a protective film or layer from the gelatin just before the hardening stage has been completed.

32. The process of preparing protective shields against substances such as mustard gas, including the steps of intermixing gelatin in a weakly acidulated aqueous solution together with a plasticizer and a quantity of an oxidizing agent which also is effective as a hardening agent for gelatine, the quantity of such oxidizing agent being sufficient so that a substantial quantity thereof will remain effective as an oxidizing agent and dispersed throughout the gelatin after the gelatin has become hardened, and forming a protective film or layer from the gelatin just before the hardening stage has been completed.

33. The process of preparing protective shields against substances such as mustard gas, including the steps of intermixing gelatin in a weakly acidulated aqueous solution together with a plasticizer and a quantity of an oxidizing agent which also is effective as a hardening agent for gelatine at a substantially fixed temperature of 60° C., the quantity of such oxidizing agent being sufficient so that a substantial quantity thereof will remain effective as an oxidizing agent and dispersed throughout the gelatin after the gelatin has become hardened, and forming a protective film or layer from the gelatin just before the hardening stage has been completed.

34. The process of preparing protective shields against substances such as mustard gas, including the steps of intermixing gelatin in aqueous solution weakly acidulated with citric acid together with a hygroscopic plasticizer and a quantity of an oxidizing agent which also is effective as a hardening agent for gelatine at a substantially fixed temperature of 60° C., the quantity of such oxidizing agent being sufficient so that a substantial quantity thereof will remain effective as an oxidizing agent and dispersed throughout the gelatin after the gelatin has become hardened, and forming a protective film or layer from the gelatin just before the hardening stage has been completed.

35. The process of preparing protective shields against substances such as mustard gas, including the steps of intermixing gelatin in a weakly acidulated aqueous solution together with glycerin and a quantity of a salt of dichromic acid and an alkali metal at a substantially fixed temperature of 60° C., the quantity of said salt of dichromic acid being sufficient so that a substantial quantity thereof will remain effective as an oxidizing agent and dispersed throughout the gelatin after the gelatin has become hardened, and forming a protective film or layer from the gelatin just before the hardening stage has been completed.

36. The process of preparing protective shields against substances such as mustard gas, including the steps of intermixing with a weakly acidulated 20% solution of gelatin a quantity of glycerin and a salt of dichromic acid and an alkali metal at a substantially fixed temperature of 60° C., the salt of dichromic acid being in the proportion of about one part to four parts of gelatin and being sufficient so that a substantial quantity thereof will remain effective as an oxidizing agent and dispersed throughout the gelatin after the gelatin has become hardened, and forming a protective film or layer from the gelatin just before the hardening stage has been completed.

37. The process of preparing protective shields against substances such as mustard gas, including the steps of intermixing with a weakly acidulated 20% solution of gelatin a quantity of glycerin and a salt of dichromic acid and an alkali metal at a substantially fixed temperature of 60° C., the salt of dichromic acid being in the proportion of about one part to four parts of gelatin and being sufficient so that a substantial quantity thereof will remain effective as an oxidizing agent and dispersed throughout the gelatin after the gelatin has become hardened, the glycerin being in the proportion of about 10 to 40 parts to about 20 parts of gelatin, and forming a protective film or layer from the gelatin just before the hardening stage has been completed.

MAJER MENDELSOHN.